(12) United States Patent
Götz et al.

(10) Patent No.: US 10,981,457 B2
(45) Date of Patent: Apr. 20, 2021

(54) COOLING DEVICE FOR A VEHICLE CHARGING STATION

(71) Applicant: Dr. Ing. h.c. F. Porsche Aktiengesellschaft, Stuttgart (DE)

(72) Inventors: Stefan Götz, Forstern (DE); Manuel Groß, Hessigheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 350 days.

(21) Appl. No.: 15/960,818

(22) Filed: Apr. 24, 2018

(65) Prior Publication Data

US 2018/0334049 A1 Nov. 22, 2018

(30) Foreign Application Priority Data

May 17, 2017 (DE) .......................... 102017110703.7

(51) Int. Cl.
| | | |
|---|---|---|
| *B60L 53/00* | (2019.01) | |
| *B60L 11/18* | (2006.01) | |
| *H01M 10/663* | (2014.01) | |
| *B60L 53/22* | (2019.01) | |
| *B60L 53/30* | (2019.01) | |

(Continued)

(52) U.S. Cl.
CPC .......... *B60L 53/00* (2019.02); *B60L 11/1824* (2013.01); *B60L 53/11* (2019.02); *B60L 53/22* (2019.02); *B60L 53/302* (2019.02); *B60L 53/32* (2019.02); *H01M 10/663* (2015.04); *H02J 7/0027* (2013.01); *H02J 7/0042* (2013.01);

(Continued)

(58) Field of Classification Search
CPC ...... B60L 11/1824; B60L 53/00; B60L 53/22; B60L 53/32; B60L 53/11; B60L 53/30; B60L 2270/44; H02J 7/0027; H02J 7/0042; H02J 7/02
USPC ........................................................ 320/109
See application file for complete search history.

(56) References Cited

U.S. PATENT DOCUMENTS 6,239,502 B1 *  5/2001  Grewe ..................... B60K 6/46
                                                      290/1 B
9,067,477 B2    6/2015  Onimaru et al.
(Continued)

FOREIGN PATENT DOCUMENTS

CN    101587961 A    11/2009
CN    204179495 U     2/2012
(Continued)

OTHER PUBLICATIONS

Japanese Notification of Reason for Rejection for Japanese Application No. 2018-093476, dated Apr. 26, 2019, 4 pages.
(Continued)

*Primary Examiner* — Nathaniel R Pelton
(74) *Attorney, Agent, or Firm* — RatnerPrestia

(57) ABSTRACT

A cooling device cools a charging station or a multiplicity of charging stations of a charging park. The respective charging station has an internal coolant duct for a coolant to flow through the charging station, an input-side coolant connection, an output-side coolant connection, a coolant circuit with a cooling assembly for cooling the coolant, and a pump for pumping the coolant in the coolant circuit. The coolant duct of the respective charging station is integrated into the coolant circuit. A heat accumulator or a multiplicity of heat accumulators is integrated into the coolant circuit.

15 Claims, 2 Drawing Sheets

(51) Int. Cl.
  *H02J 7/00* (2006.01)
  *B60L 53/10* (2019.01)
  *H02J 7/02* (2016.01)
  *B60L 53/302* (2019.01)
  *F01P 11/20* (2006.01)

(52) U.S. Cl.
  CPC ............. *H02J 7/02* (2013.01); *B60L 2270/44* (2013.01); *F01P 2011/205* (2013.01)

(56) References Cited

U.S. PATENT DOCUMENTS

| | | | |
|---|---|---|---|
| 9,260,025 | B1 | 2/2016 | McGrath |
| 10,017,072 | B2 | 7/2018 | Galamb |
| 10,457,153 | B2 * | 10/2019 | Wischnack ............. B60L 53/22 |
| 2012/0102995 | A1 | 5/2012 | Sakata |
| 2012/0153874 | A1* | 6/2012 | Lachenmeier ........ B60W 10/24 318/1 |
| 2015/0054460 | A1* | 2/2015 | Epstein ................. B60L 11/187 320/109 |
| 2016/0200206 | A1 | 7/2016 | Woo et al. |
| 2017/0088007 | A1* | 3/2017 | Melendez ........... H01M 10/625 |
| 2018/0229616 | A1* | 8/2018 | Rhodes ..................... F24D 7/00 |

FOREIGN PATENT DOCUMENTS

| | | |
|---|---|---|
| CN | 205212459 U | 5/2016 |
| CN | 106026233 A | 10/2016 |
| DE | 102009008513 A1 | 8/2010 |
| DE | 102010044999 A1 | 3/2012 |
| DE | 102010041919 A1 | 4/2012 |
| DE | 102011101003 A1 | 5/2012 |
| DE | 102012206308 A1 | 10/2012 |
| DE | 102015222703 A1 | 5/2017 |
| DE | 102016224103 A1 | 6/2018 |
| EP | 2492133 A2 | 8/2012 |
| EP | 2672200 A1 | 12/2013 |
| FR | 2962863 A1 | 1/2012 |
| GB | 2289618 A | 11/1995 |
| JP | 07312805 A | 11/1995 |
| JP | 2016522537 A | 7/2016 |
| WO | 2013061132 A2 | 5/2013 |

OTHER PUBLICATIONS

Chinese Office Action for Chinese Application No. 201810462558.X, dated Apr. 7, 2020, 9 pages.
German Search Report for German Application No. 10 2017 110 703.7, dated May 14, 2018, with partial English translation, 8 pages.
Chinese Office Action for Chinese Application No. 201810462558.X, dated Sep. 4, 2019, 7 pages.
European Search Report for European Application No. 18020037.0, dated Jul. 17, 2018—15 pages.
European Search Report for European Application No. 18020037.0, dated Nov. 29, 2018—13 pages.
Vorrath, S., et al., "Old-Made EV Fast Charging Technology Wins EU Supply Deal," RenewEconomy, Oct. 20, 2014, 7 pages, XP055680550, retrieved on the Internet: https://reneweconomy.com.au/australian-ev-fast-charger-echnology-wins-37000/ [retrieved Mar. 27, 2020].
TinniT Technology GmbH, "Latent Heat Storage for Domestic Use", Apr. 15, 2017, 2 pages, XP055764488, retrieved the Internet: https://www.tinnit.de/index.php?cat=Umwelttechnik&page=Latentw%C3%A4rmespeicher [retrieved Jan. 13, 2021].
E-Wald: "Veefil 50kW Fast Charger," Aug. 30, 2016, 11 pages, XP055680551, retrieved the Internet: http://wallbe.de/wp-content/uploads/2016/08/veefil.pdf [retrieved Mar. 27, 2020].

* cited by examiner

COOLING DEVICE FOR A VEHICLE CHARGING STATION

CROSS-REFERENCE TO RELATED APPLICATION

This application claims priority to German Patent Application No. DE 10 201 703.7, filed May 17, 2017, which is incorporated by reference herein in its entirety.

FIELD OF THE INVENTION

The invention relates to a cooling device, in particular for a charging station or for a charging park for electrically charging, in particular, motor vehicles. The invention also relates to a method for operating such a cooling device.

BACKGROUND OF THE INVENTION

Charging stations are used to charge electrical energy accumulators, in particular of motor vehicles. A charging park constitutes a collection of a multiplicity of charging stations which is provided, for example, at a car park or a multistory car park, in order also to be able to charge a multiplicity of motor vehicles at the same time.

Contemporary electric vehicles generally permit two charging modes for charging the electrical energy accumulator. A first charging mode is referred to as an AC charging mode.

For charging at a conventional AC voltage socket or three-phase socket the motor vehicle generally has an integrated charger device, referred to as an on-board charger device, which permits the conversion of AC current into DC current and controls the charging operation. However, this AC charging mode is severely restricted in terms of the charging speed owing to the available connection power of generally not more than 16 A or 32 A at approximately 230 V or approximately 400 V and owing to the installed charger device with sufficient power. This results in contemporary electric vehicles in charging times of up to several hours per 100 km distance traveled.

In order to improve these low charging speeds, what is referred to as DC charging with direct voltage is often also possible. In contrast to AC charging, the vehicle does not generally have a separate charger device for DC charging. Instead, the vehicle-external charging pillar carries out the charging process and likewise shapes the voltage and the current in such a way as is necessary for the charging of the battery. During the charging process, the DC charging lines are connected directly to the poles of the high voltage battery of the vehicle. There is no galvanic separation between the DC charging lines and the high voltage battery. The power of DC charging stations is currently up to 50 kW, which is also still capable of being increased, in order to shorten the charging times further.

In charging voltages of up to approximately 1000 V, charging speeds of 20 km/min or more can be achieved. Therefore, the recharging during journeys can be provided at rates which customers are accustomed to from refueling vehicles with internal combustion engines. The high power levels of several hundred kilowatts which are associated therewith generate high losses in the power electronics, the cables and further components in the form of heat. This makes cooling necessary in order to protect the components against excessive heat.

However, such charging stations are generally not in use in a chronologically continuous fashion. The next use of the charging station can also only be predicted to a very limited degree, with the result that after use an immediate subsequent use can take place or else there can be a relatively long time of non-use.

SUMMARY OF THE INVENTION

Described herein is a cooling device which is compatible with the requirements of the cooling demands and nevertheless operates efficiently in terms of energy, as well as a method for operating such a cooling device.

One exemplary embodiment of the invention relates to a cooling device for cooling a charging station or a multiplicity of charging stations of a charging park, wherein the respective charging station has an internal coolant duct for a coolant to flow through the charging station, with an input-side coolant connection and with an output-side coolant connection, with a coolant circuit with a cooling assembly for cooling the coolant and with a pump for pumping the coolant in the coolant circuit, wherein the coolant duct of the respective charging station is integrated into the coolant circuit, wherein a heat accumulator or a multiplicity of heat accumulators is integrated into the coolant circuit. This ensures that heat can be discharged very quickly in order to achieve rapid cooling even if the coolant circuit has a certain degree of inertia with respect to the cooling, and rapid thermal loads as a result of sudden use of a charging station or of charging stations cannot subsequently occur. As a result of the use of the heat accumulator, the coolant circuit can be given weaker dimensions because heat can be discharged quickly enough by means of the heat accumulator. As a result, savings, can be implemented in the cooling device.

In one exemplary embodiment it is advantageous if the heat accumulator or the heat accumulators is/are a phase-change heat accumulator or an enthalpy-based thermal accumulator. As a result, a relatively large amount of heat can be stored relatively quickly because with the phase transition it is possible to use a large enthalpy quantity for a short period.

It is also advantageous if the phase-change heat accumulator or the enthalpy-based thermal accumulator has a material which uses a phase transition, a solution enthalpy or the like. The speed and the quantity of heat which can be discharged can be defined by the respective form of the use of the enthalpy or of the phase transition. It is also possible for a plurality of heat accumulators which can have different speeds and can absorb different quantities of heat to be used.

It is also advantageous if the material is or has a salt, a salt hydrate, organic compounds, in particular long-chain organic compounds and/or paraffin. As a result, the desired phase transitions can be selected in a targeted fashion with respect to the quantity of heat which can be absorbed and the phase transition speed.

It is also particularly advantageous if the heat accumulator or at least one heat accumulator is arranged in the coolant circuit in the forerun of the charging station or in the forerun of the charging stations. As a result, even undercooling of the coolant can be achieved directly upstream of the heat source which is to be cooled of the charging station. It is also possible to provide conditioning of the heat source directly at the start of the charging process in order to utilize the locally present thermal capacity of coolant, a cooling plate which is provided in the charging station and/or other parts in the cooling chain without having to wait for the long delay for a circulation of the coolant through the entire coolant circuit. It is also possible here for the heat accumulator to be used for cooling even if there is a failure of the coolant circuit and, for example, no other back cooling whatsoever takes place any more, in order, for example, to continue to carry out the charging process or to protect the heat source, such as in particular the power electronics. In this case it is particularly advantageous if the heat accumulator can be activated in a targeted fashion as a radiator, for example by initiating the solution of a substance in a solvent, by activating a phase transition, for example the melting process by making available the activation energy, etc.

In a further exemplary embodiment it is expedient if the heat accumulator or at least one heat accumulator is arranged in the coolant circuit in the reflux of the charging station or in the reflux of one of the charging stations or in the reflux of all the charging stations. This ensures that a reduction in the coolant temperature can be implemented before the next heat source. This also ensures protection against intermediate excessive heating of the coolant because it can be cooled again between the charging stations or between the heat sources. This does not require any controllable activation of the cooling process. It is therefore also possible to use a material for the heat accumulator which automatically absorbs heat at a limiting temperature, for example as a result of the melting temperature being reached, and stabilizes the temperature of its own reflux at this threshold. However, it is alternatively also possible to use a material which can be controlled in a targeted fashion.

Owing to, under certain circumstances, even only occasional use of the charging park, under-dimensioning of the actual cooling system is possible. Instead of the configuration of the cooling performance with respect to the peak loss performance of the cooling device at any time, the thermal capacity of the coolant circuit as well as the heat accumulator or the heat accumulators can also be included. The cooling device is advantageously capable here, together with the heat accumulator or heat accumulators, of keeping the cooling device or the coolant below the maximum temperature up to the end of the charging process. The thermal energy which is absorbed in the heat accumulator or in the heat accumulators can subsequently be slowly discharged again via the cooling assembly in the next charging interval.

In the event of a failure of the cooling device or of the cooling assembly, the heat accumulator can also be used, for example, to continue to carry out the charging process or to protect the heat source, such as for example the power electronics.

It is thus also possible for the heat accumulator or at least one heat accumulator to be arranged in the coolant circuit between two charging stations.

One exemplary embodiment of the invention relates to a method for operating a cooling device for cooling a charging station or a multiplicity of charging stations of a charging park, wherein the respective charging station has an internal coolant duct for a coolant to flow through the charging station, with an input-side coolant connection and with an output-side coolant connection, with a coolant circuit with a cooling assembly for cooling the coolant and with a pump for pumping the coolant in the coolant circuit, wherein the coolant duct of the respective charging station is integrated into the coolant circuit, wherein a heat accumulator or a multiplicity of heat accumulators is integrated into the coolant circuit and the cooling device is operated in such a way that heat is stored in the at least one heat accumulator before and/or during operation of a charging station. This ensures that heat can be discharged quickly even if the coolant circuit is relatively inert.

It is also particularly advantageous if a stored quantity of heat is extracted from the heat accumulator again by means of the coolant if the charging station or at least one charging station is not operated for charging.

It is also advantageous if, a stored quantity of heat is extracted from the heat accumulator again by means of the coolant if the heat which is present in a charging station or in the charging stations is less than the heat which can be discharged by means of the coolant.

BRIEF DESCRIPTION OF THE DRAWINGS

In the text which follows, the invention is explained in more detail on the basis of an exemplary embodiment and with reference to the drawing, in which.

DETAILED DESCRIPTION OF THE INVENTION

Figure 1:
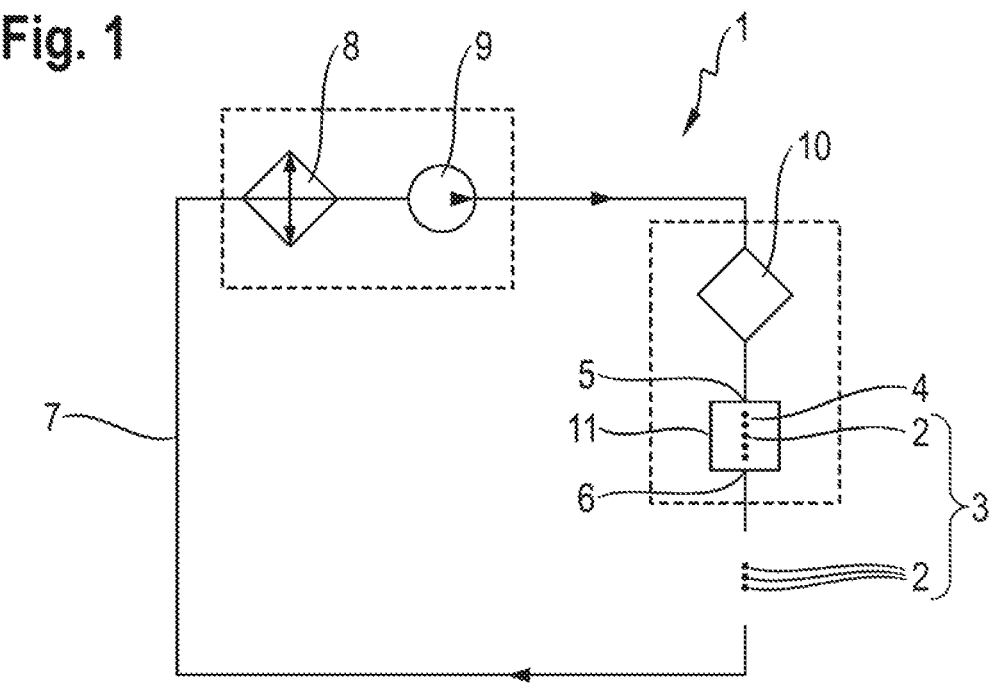
FIG. 1 shows a schematic illustration of a cooling device with a coolant circuit.

FIG. 1 shows a schematic view of a cooling device 1 for cooling a charging station 2 or a multiplicity of charging stations 2 of a charging park 3.

The respective charging station 2 has here an internal coolant duct 4 for a coolant to flow through the charging station 2, wherein the charging station is provided with an input-side coolant connection 5 and with an output-side coolant connection 6, in order to connect the internal coolant duct 4 of the charging station 2 to a coolant circuit 7, with the result that the coolant which flows into the coolant circuit 7 can also flow through the internal coolant duct 4 and can absorb heat there, in order to be able to cool the charging station or the components thereof, such as, in particular, electronics and/or power electronics, cables, charging cables, etc. In this context, the charging station 2 preferably has a cooling plate which is in thermal contact with the internal coolant duct 4, wherein components to be coded are in thermal contact with the cooling plate.

The coolant circuit 7 is provided with a cooling assembly 8 for cooling the coolant and with a pump 9 for pumping the coolant in the coolant circuit 7, wherein the internal coolant duct 4 of the respective charging station 2 is integrated into the coolant circuit 7, with the result that the coolant can flow through the charging stations in a serial and/or parallel fashion. In the exemplary embodiment in FIG. 1, the charging stations 2 are arranged in a serial fashion with respect to the through-flow of coolant, but they can also otherwise be connected in a parallel and/or serial fashion. In this context, groups of charging stations 2 can also be connected in parallel, wherein in one group the charging stations 2 are connected in a serial fashion.

Furthermore, in FIG. 1 it is apparent that a heat accumulator 10 or a multiplicity, of heat accumulators 10 is integrated into the coolant circuit 7 in the forerun of the charging station 2 or in the forerun of the charging stations 2. The heat accumulator 10 is preferably connected upstream of a cooling plate of the charging station 2 here. The heat accumulator 10 is, under certain circumstances, arranged separately from the charging station 2 or the charging stations 2 here. The heat accumulator 10 or a heat accumulator 10 can also be integrated into the charging station 2.

The heat, accumulator 10 is preferably a phase-change heat accumulator or, an enthalpy-based thermal accumulator, such as a heat accumulator. In this context, the phase-change heat accumulator or the enthalpy-based thermal accumulator has a material which uses a phase transition, a solution enthalpy, a reaction enthalpy or the like, in order to be able to store heat. In this context, the storable quantity of heat and the storage speed depend on the selection of the material of the heat accumulator and/or on the quantity of material or the arrangement or connection thereof.

The material of the heat accumulator 10 can be or have a salt, a salt hydrate, organic compounds, in particular long-chain organic compounds and/or paraffin.

Figure 2:
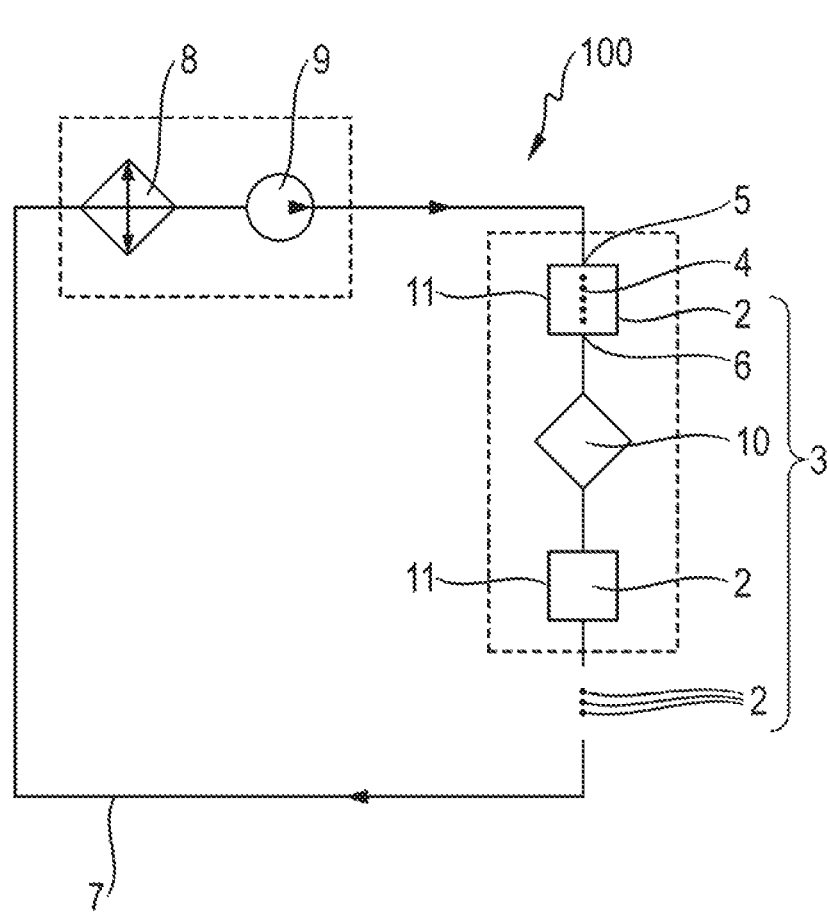
FIG. 2 shows a schematic illustration of an alternative cooling device with a coolant circuit.

FIG. 2 shows a further exemplary embodiment of a cooling device 100 for cooling a charging station 2 or a multiplicity of charging stations 2 of a charging park 3.

The respective charging station 2 also has, like the exemplary embodiment in FIG. 1, an internal coolant duct 4 for a coolant to flaw through the charging station 2, wherein the charging station is provided with an input-side coolant connection 5 and with an output-side coolant connection 6, in order to connect the internal coolant duct 4 of the charging station 2 to a coolant circuit 7, with the result that the coolant which flows in the coolant circuit 7 can also flow through the internal coolant duct 4 and can absorb heat there, in order to be able to cool the charging station or components thereof, such as, in particular, electronics and/or power electronics, cables, charging cables, etc. In this context, the charging stations preferably have a cooling plate which is in thermal contact with the internal coolant duct 4, wherein components to be cooled are in thermal contact with the cooling plate.

The coolant circuit 7 is provided with a cooling assembly 8 for cooling the coolant and with a pump 9 for pumping the coolant in the coolant circuit 7, wherein the internal coolant duct 4 of the respective charging station 2 is integrated into the coolant circuit 7, with the result that the coolant can flow through the charging stations in a serial and/or parallel fashion. In the exemplary embodiment in FIG. 2, the charging stations 2 are also arranged in a serial fashion with respect to the through-flow of coolant, but they can correspondingly also otherwise be connected in a parallel and/or serial fashion. In this context, groups of charging stations 2 can also be connected in a parallel fashion, wherein in one group the charging stations 2 are connected in a serial fashion.

Furthermore, it is apparent in FIG. 2 that a heat accumulator 10 or a multiplicity of heat accumulators 10 is integrated into the coolant circuit 7 in the reflux of one of the charging stations 2 or between two charging stations 2. The heat accumulator 10 is preferably connected downstream of a cooling plate of the charging station 2 here. The heat accumulator 10 is, under certain circumstances, arranged separately from the charging station 2 or from the charging stations 2 here. The heat accumulator 10 or a heat accumulator 10 can also be integrated into the charging station 2.

The heat accumulator 10 is correspondingly again preferably a phase-change heat accumulator or an enthalpy-based thermal accumulator such as a heat accumulator. In this context, the phase-change heat accumulator or the enthalpy-based thermal accumulator has a material which uses a phase transition, a solution enthalpy, a reaction enthalpy or the like in order to be able to store heat. In this context, the storable quantity of heat and the storage speed depend on the selection of the material of the heat accumulator and/or also on the quantity of the material or the arrangement or connection thereof.

The material of the heat accumulator 10 can be or have a salt, a salt hydrate, organic compounds, in particular long-chain organic compounds and/or paraffin.

In FIGS. 1 and 2, the respective charging station 2 is assigned a temperature sensor 11 which detects the temperature of the charging station or the components thereof, such as, in particular, the cooling plate thereof. The sensor signal of the temperature sensor serves to control the activation or deactivation of the heat accumulator if the latter is configured as a heat accumulator which can be activated in a targeted fashion. As a result, the phase transition etc. or the like can be controlled in a chronological fashion, in order to be able to absorb heat in a targeted fashion.

Figure 3:
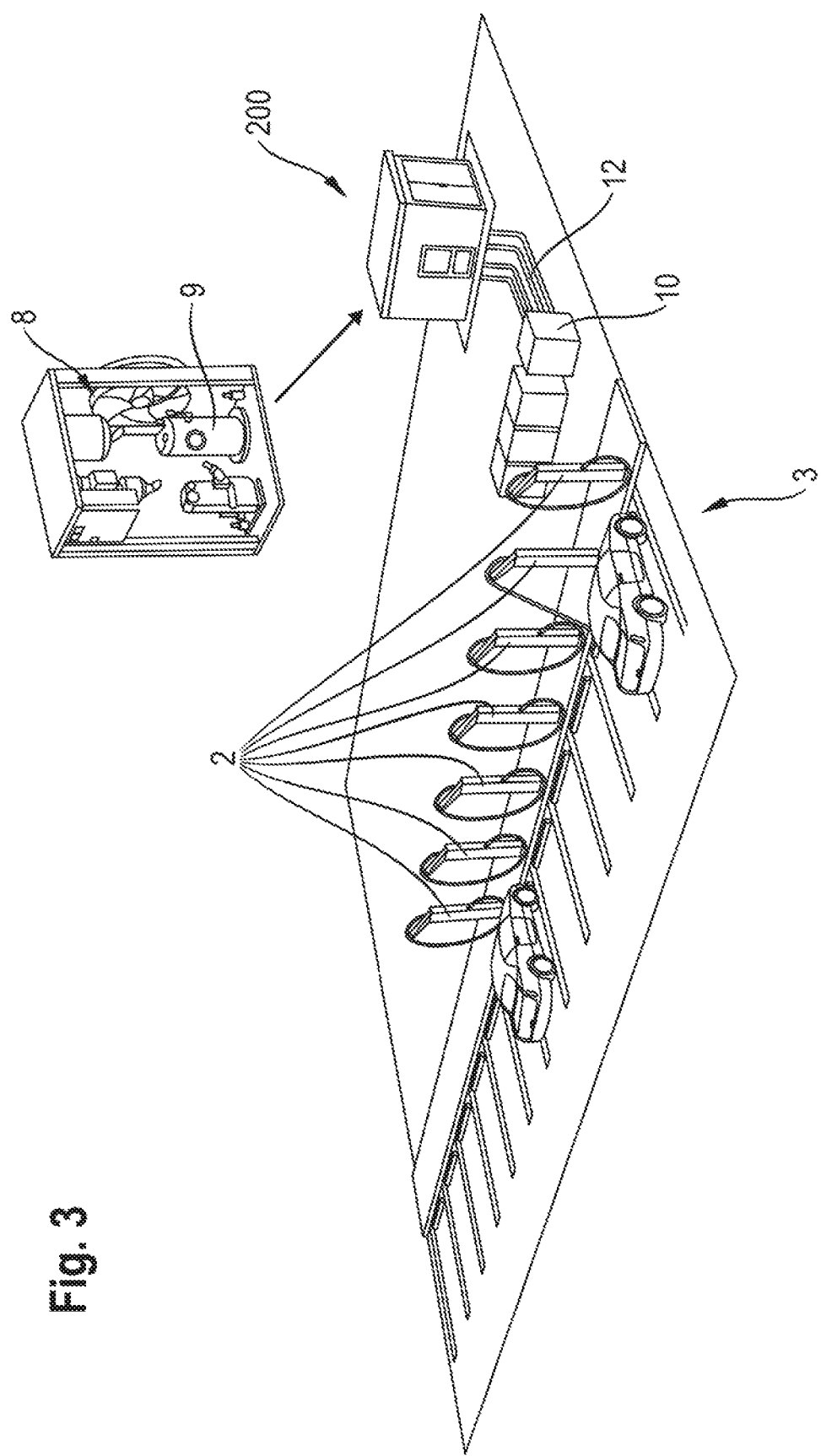
FIG. 3 shows a schematic perspective illustration of a cooling device for a charging station or for a charging park with a multiplicity of charging stations.

FIG. 3 shows an exemplary embodiment of a cooling device 200 with a charging park 3 with charging stations 2. In this context, the cooling assembly 8 with a pump 9 is preferably arranged spatially separate from the charging stations 2. The charging assembly 8 and the pump 9 are connected in a coolant circuit 7 to coolant lines 12 which also integrate the charging stations 2 in the coolant circuit 7. It is also possible to see a heat accumulator 10 which is embodied as a phase-change accumulator or enthalpy-based thermal accumulator as described above. The latter is preferably arranged in a power electronics housing which is assigned to at least one charging station or the power electronics thereof. In this context, the power electronics of the charging station are suitably not integrated into the charging station but rather integrated separately therefrom into the corresponding power electronics housing. The power electronics of all the charging stations or only some of the charging stations can also be integrated into such a power electronics housing. It is also possible to provide a plurality of such power electronics housings. These are typically integrated thermally into the coolant circuit. In this context, a heat accumulator 10 can be assigned to just one of the power electronics housings or to all of said housings.

The invention also relates to a method for operating a cooling device 1, 100, 200 for cooling a charging station 2 or a multiplicity of charging stations 2 of a charging park 3, wherein the respective charging station 2 has an internal coolant duct 4 for a coolant to flow through the charging station 2, with an input-side coolant connection 5 and with an output-side coolant connection 6. For this purpose, the coolant circuit 7 is provided with the cooling assembly 8 for cooling the coolant and with a pump 9 for pumping the coolant in the coolant circuit. In this context, the coolant duct 4 of the respective charging station 2 is integrated into the coolant circuit 7. The at least one heat accumulator or a multiplicity of heat accumulators is also integrated into the coolant circuit. The cooling device 1, 100, 200 is operated here in such a way that heat is stored in the at least one heat accumulator before and/or during operation of a charging station. As a result, pre-cooling of the coolant is brought about and/or a currently generated quantity of heat is stored in the heat accumulator, in order to avoid loading the coolant excessively in thermal terms. The operation of the cooling device is preferably such that a stored quantity of heat is extracted from the heat accumulator again by means of the coolant if the charging station or at least one charging station is not operated for charging, that is to say there is no additional or current high thermal load on the coolant or the cooling assembly.

It is therefore also advantageous for operation if a stored quantity of heat is extracted from the heat accumulator again by means of the coolant if the heat which is present in a charging station or in the charging stations is less than the heat which can be discharged by means of the coolant.

The release of the thermal energy or quantity of heat which is stored in the phase-change material preferably occurs at a time at which no activity at all, or significantly less activity, is detected in the charging park and therefore also a significantly reduced charging power compared to the installed power can also be expected. The detection of the activity can be carried out, for example, by means of the events described below. In addition, it is also possible to quantify the activity:

In this context, movement sensors can be evaluated which monitor the charging park. User inputs can also be evaluated at user units. It is also possible to evaluate the withdrawing of charging plugs from their receptacle on the charging station.

Furthermore, the time of day can be taken into account. Likewise, historical data from preceding days can be evaluated. The external temperature can also be evaluated since cold temperatures shorten the electrical range of vehicles owing to the heating system which is switched on by the drivers, and likewise extremely hot external temperatures shorten the range owing to the use of an air-conditioning system, which requires more frequent charging.

One exemplary embodiment of the invention can provide, for the purpose of feeding back the thermal energy or quantity of heat stored in the phase-change material, that by means of switchable valves the coolant circuit or the coolant is routed past a number of components, for example heat-sensitive ones, in order to prevent them being heated up by the abovementioned thermal energy.

In this way, these components are bypassed and the heated cooling medium is conducted, in particular as directly or quickly as possible, back into the reflux to the cooling system, which absorbs the energy which has been released by the phase-change material.

What is claimed is:

1. A cooling device for cooling a first charging station and a second charging station of a charging park, each respective charging station having an internal coolant duct for a coolant to flow through the charging station, an input-side coolant connection, and an output-side coolant connection, said cooling device comprising:
    a coolant circuit having a cooling assembly for cooling the coolant and a pump for pumping the coolant in the coolant circuit, wherein the internal coolant duct of each respective charging station is integrated into the coolant circuit,
    a plurality of heat accumulators integrated into the coolant circuit, the plurality of heat accumulators including a first heat accumulator that is connected to the first charging station and a second heat accumulator that is connected to the second charging station,
    wherein the pump is positioned at a location in the coolant circuit for delivering the coolant from the cooling assembly to each charging station and sequentially delivering coolant to said first and second heat accumulators.

2. The cooling device as claimed in claim 1, wherein the heat accumulators comprise either a phase-change heat accumulator or an enthalpy-based thermal accumulator.

3. The cooling device as claimed in claim 2, wherein the phase-change heat accumulator or the enthalpy-based thermal accumulator has a material which uses a phase transition or a solution enthalpy.

4. The cooling device as claimed in claim 3, wherein the material either is or includes a salt, a salt hydrate, or organic compounds.

5. The cooling device as claimed in claim 3, wherein the material either is or includes either a long-chain organic compounds or paraffin.

6. The cooling device as claimed in claim 1, wherein the heat accumulators are arranged in the coolant circuit upstream of the charging stations.

7. The cooling device as claimed in claim 1, wherein the heat accumulators are arranged in the coolant circuit downstream of all the charging stations.

8. The cooling device as claimed in claim 1, wherein the heat accumulators are arranged in the coolant circuit between two charging stations.

9. The cooling device as claimed in claim 1, wherein the cooling assembly and the heat accumulators are separate components of the cooling device.

10. The cooling device as claimed in claim 1, wherein the cooling assembly is positioned upstream of the heat accumulators.

11. The cooling device as claimed in claim 1, wherein the cooling assembly is positioned upstream of the pump, and the heat accumulators are positioned downstream of the pump.

12. The cooling device as claimed in claim 1, wherein the pump is positioned in the coolant circuit at a location between the cooling assembly and the heat accumulators.

13. The cooling device as claimed in claim 1, wherein the cooling assembly and the heat accumulators each individually and separately function to cool the coolant.

14. A method for operating a cooling device for cooling a first charging station and a second charging station of a charging park, wherein each charging station has an internal coolant duct for a coolant to flow through the charging station, an input-side coolant connection and an output-side coolant connection, the method comprising:
    cooling the coolant in a coolant circuit with a cooling assembly for cooling the coolant, wherein the internal coolant duct of each respective charging station is integrated into the coolant circuit, and wherein a plurality of heat accumulators are integrated into the coolant circuit, the plurality of heat accumulators including a first heat accumulator that is connected to the first charging station and a second heat accumulator that is connected to the second charging station;
    pumping the coolant in the coolant circuit using a pump to deliver the coolant from the cooling assembly to each charging station and sequentially deliver coolant to said first and second heat accumulators; and
    operating the cooling device in such a way that heat is stored in the heat accumulators either before, during, or both before and during operation of the charging stations.

15. The method as claimed in claim 14, further comprising extracting a stored quantity of heat from the heat accumulators again using the coolant if at least one of the charging stations is not operated for charging.

* * * * *